(12) United States Patent
Okumura

(10) Patent No.: US 6,682,116 B1
(45) Date of Patent: Jan. 27, 2004

(54) CONSOLE BOX STRUCTURE

(75) Inventor: Akinori Okumura, Anjo (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/338,048

(22) Filed: Jan. 7, 2003

(51) Int. Cl.$^7$ ............................................... B60N 3/00
(52) U.S. Cl. ....................................... 296/37.8; 224/275
(58) Field of Search .............................. 296/24.1, 37.1, 296/37.8, 37.14, 37.15; 224/275, 539, 926

(56) References Cited

U.S. PATENT DOCUMENTS

| | | | | |
|---|---|---|---|---|
| 4,396,172 A | * | 8/1983 | Benson ..................... | 244/129.1 |
| 4,524,701 A | * | 6/1985 | Chappell .................... | 108/44 |
| 5,397,160 A | * | 3/1995 | Landry ...................... | 296/37.8 |
| 5,479,892 A | * | 1/1996 | Edwards .................... | 119/771 |
| 6,003,927 A | * | 12/1999 | Korber et al. ............. | 296/37.8 |
| 6,231,098 B1 | * | 5/2001 | Schenk et al. ............. | 296/37.8 |
| 6,264,261 B1 | * | 7/2001 | Krafcik ...................... | 296/37.8 |

FOREIGN PATENT DOCUMENTS

| | | | | |
|---|---|---|---|---|
| JP | 58-180339 | * | 10/1983 | ................ 296/37.8 |
| JP | 04-050046 A | * | 2/1992 | ................ 296/37.8 |
| JP | 06-092186 A | * | 4/1994 | ............... 296/37.14 |

* cited by examiner

*Primary Examiner*—Glenn D. Dayoan
*Assistant Examiner*—Paul Chenevert
(74) *Attorney, Agent, or Firm*—Rossi & Associates

(57) ABSTRACT

A console box structure includes a box body comprising a pair of side walls, a rear wall connecting the pair of side walls to each other, and a bottom part, such that an opening is formed at a front of the box body and an opening is formed at a top of the box body, and a cover member capable of opening and closing the opening formed at the top of the box body. The console box structure is makes it less difficult to open and close a cover member and provides improved versatility.

9 Claims, 4 Drawing Sheets

CONSOLE BOX STRUCTURE

BACKGROUND OF THE INVENTION

(1) Field of the Invention

The present invention relates to a console box structure.

(2) Description of the Related Art

Conventionally, a console box used for storing small items is provided between a driver seat and a passenger seat in a vehicle compartment. For example, U.S. Pat. No. 6,264,261 B 1 discloses a conventional console box that is disposed between a driver seat and a passenger seat, and is comprised of a box body enclosed by front and rear walls in a direction of the length of a vehicle and right and left walls in a direction of the width of the vehicle, and a cover member that is opened and closed to cover and uncover an opening formed at the top of the box body.

With the conventional console box, however, the cover member must be opened and closed every time a driver or a passenger stores items in the box body, making storage operations inconvenient for the user. In particular, in the case where the cover member also functions as an arm rest, the cover member is of increased size because it must be provided with a cushioning member or the like, which makes it more troublesome to open and close the cover member.

Further, the conventional console box has the disadvantage of lacking versatility, because the range of storage in the box body is restricted in advance by the right, left, front, and rear walls thereof.

SUMMARY OF THE INVENTION

The present invention provides a console box structure that makes it less troublesome to open and close a cover member of the console box structure to store items, and provides a console box structure with improved versatility.

Specifically, the present invention provides a box body comprising a pair of side walls, a rear wall connecting the pair of side walls to each other, and a bottom part, such that an opening is formed at a front of the box body and an opening is formed at a top of the box body, and a cover member capable of opening and closing the opening formed at the top of the box body.

BRIEF DESCRIPTION OF DRAWINGS

The nature of this invention, as well as other subjects and advantages thereof, will be explained in greater detail with reference to certain preferred embodiments and to the accompanying drawings, in which like reference character designate the same or similar parts throughout the figures, wherein:

FIGS. 6A and 6B are perspective views showing the console box 1, wherein FIG. 6A shows the console box 1 with its cover member 9 open, and FIG. 6B shows the console box 1 with its cover member 9 and inner cover 11 open.

DETAILED DESCRIPTION OF THE PREFERRED EMBODIMENTS

The present invention will now be described in detail with reference to the drawings showing a preferred embodiment thereof.

Figure 1:
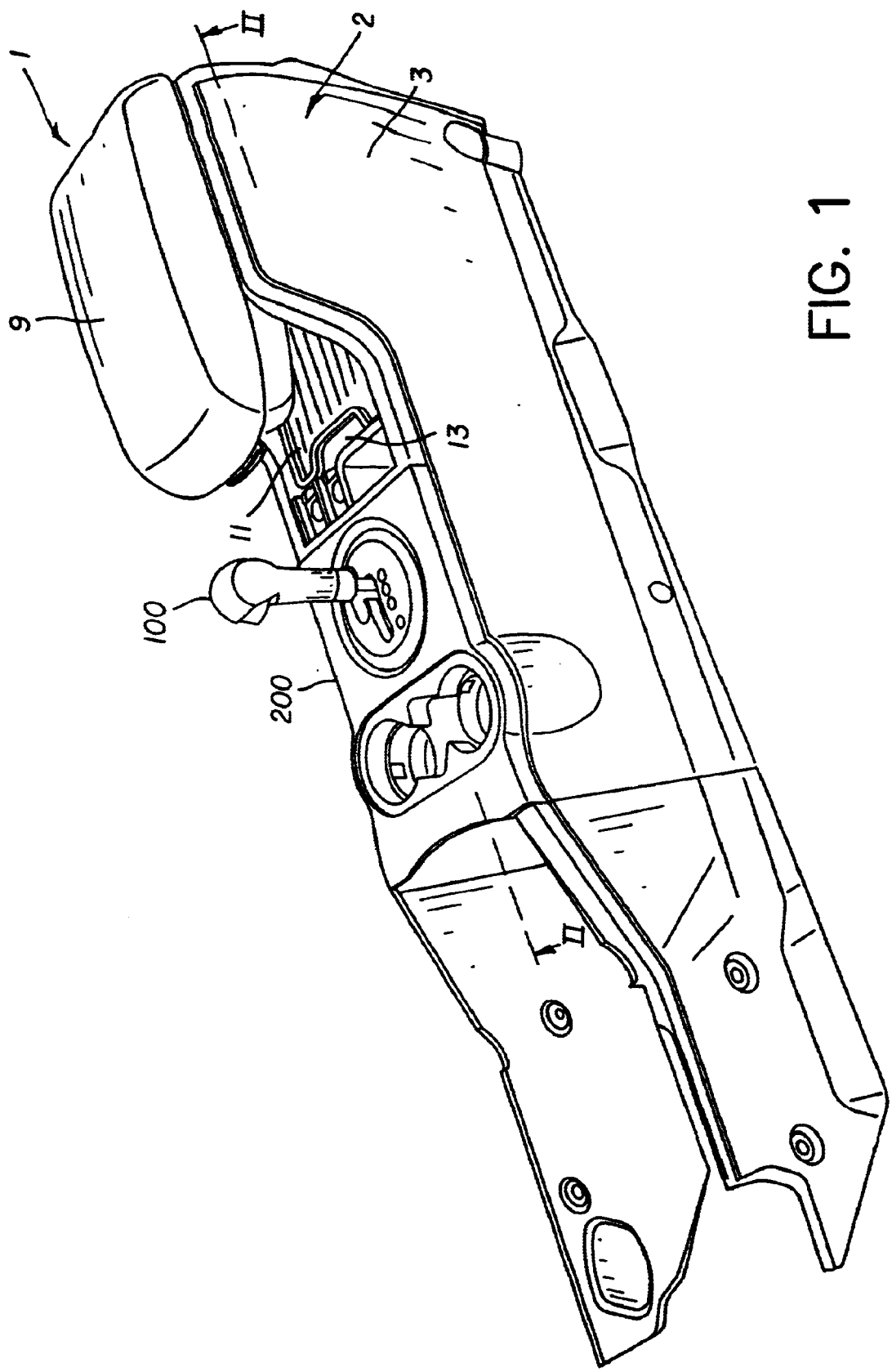
FIG. 1 is a perspective view showing the entire console box 1 according to an embodiment of the present invention.

A console box 1 shown in FIG. 1 is disposed between a driver seat and a passenger seat, neither of which is illustrated, and is comprised of a box body 2 that is provided behind a shift lever 100 and extends in the direction of the length of a vehicle. The box body 2 is enclosed by a pair of side walls 3 positioned at the right and left in the direction of the width of the vehicle, a rear wall 4 that is positioned in the rear of the console box 1 and connects the pair of side walls 3 to each other, and a bottom part 10, such that a first opening 6 is formed at the top of the console box 1 and a second opening 7 is formed at the front of the console box 7, thus forming a housing chamber 5 capable of storing small items and the like. According to the present embodiment, the first opening 6 and the second opening 7 are continuous.

A cover member 9 is attached to the rear part of the box body 2 via a hinge. Pulling up on a lever 21 causes the cover member 9 to turn upward and open the closed first opening 6. According to the present embodiment, the cover member 9 also serves as an armrest, and has a cushioning material incorporated therein.

Figure 2:
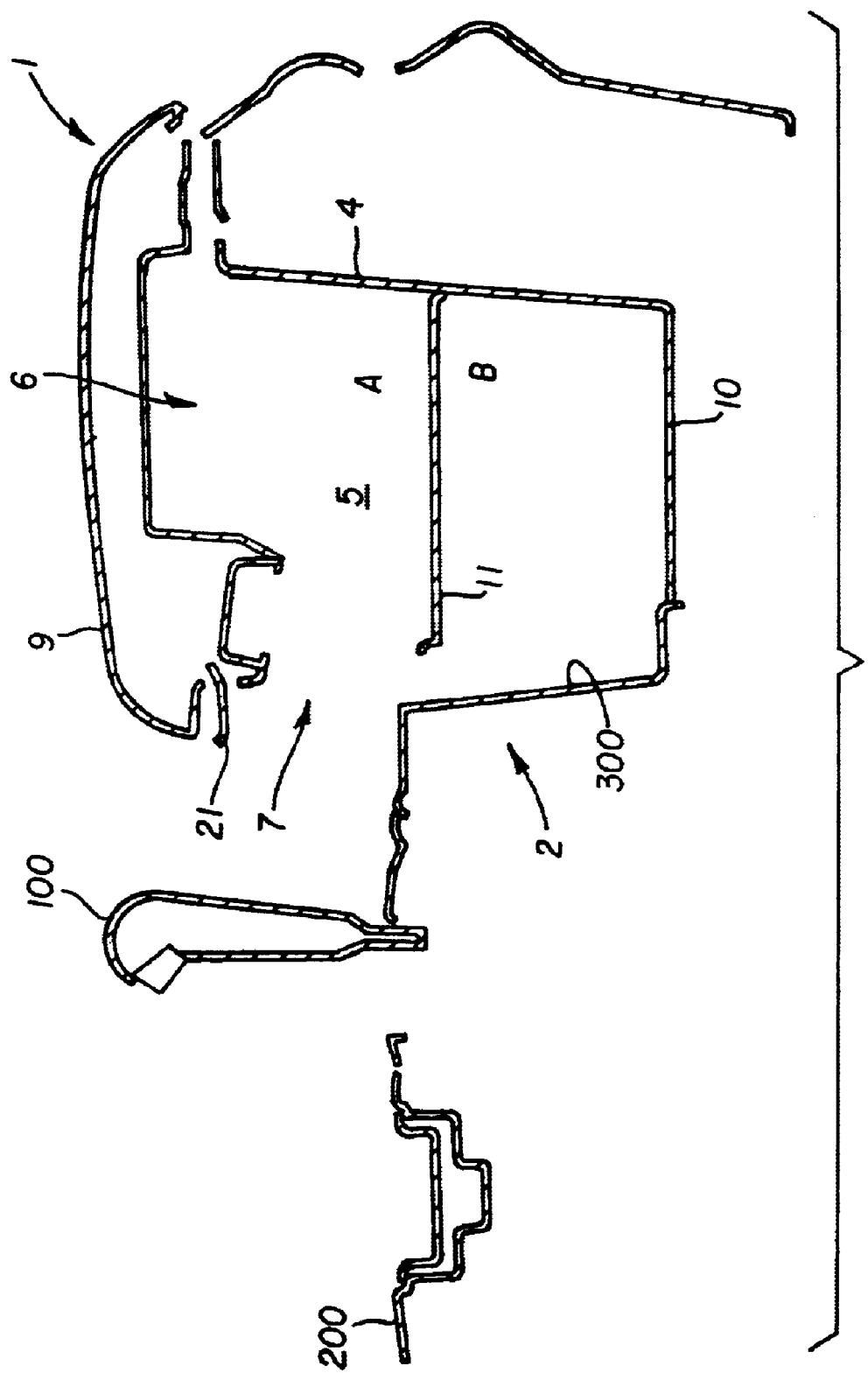
FIG. 2 is a view taken along an arrow II—II of FIG. 1.

As shown in FIG. 2, the housing chamber 5 is divided into an upper space A and a lower space B by an inner cover 11. To increase the capacity of the housing chamber 5, the height of the bottom part 10 of the box body 2 is set to be below upper surface of a base 200 on which the shift lever 100 is mounted. Therefore, the front wall of the box body 2 does not exist in the upper space A of the housing chamber 5, but a front wall 300 of the box body 2 exists in the lower space B of the housing chamber 5.

Figure 3:
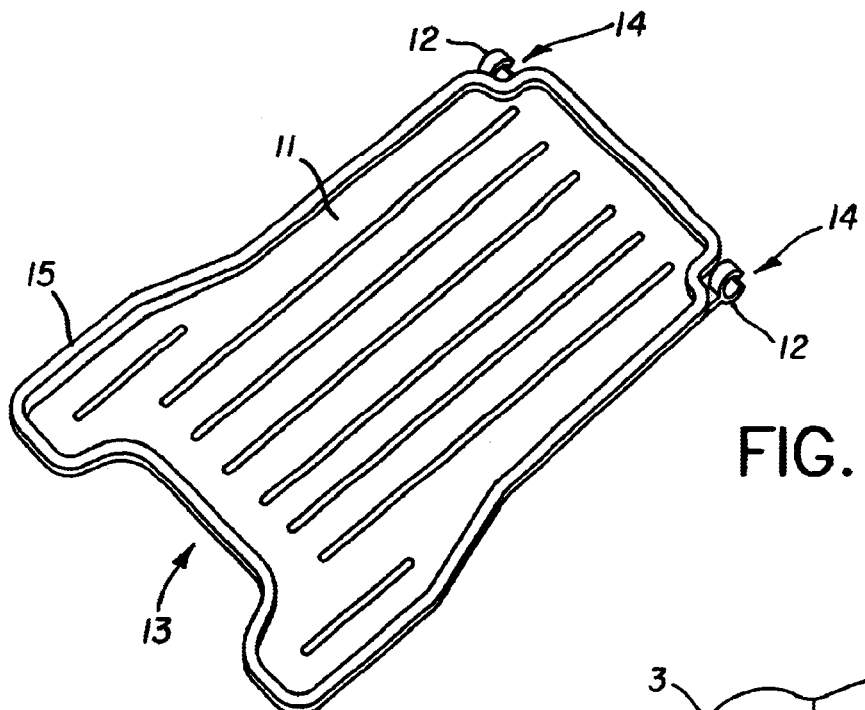
FIG. 3 is a view showing the entire inner cover 11.

As shown in FIG. 3, the inner cover 11 has a step portion 15 at an edge thereof, which is intended to prevent items placed on the inner cover 11 from easily jumping out of the upper space A of the housing chamber 5 while the vehicle is running. The height of the step portion 15 is set such that the front part thereof is higher than the rear part thereof. A concave portion 13 provides a space into which a fingertip is inserted, and is preferably formed at the front of the inner cover 11 so as to make it easier to open and close the inner cover 11. Further, a pair of ring portions 12 each having a notch 14 is provided at the right and left in the rear of the inner cover 11.

Figure 4:
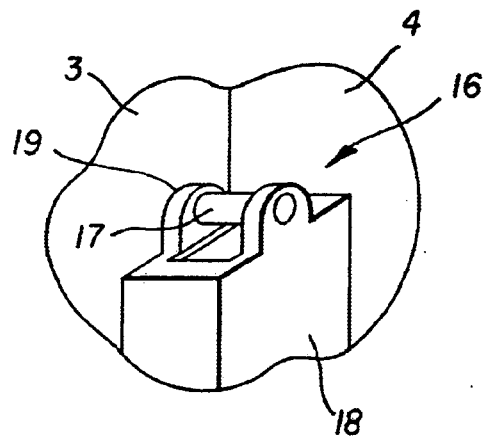
FIG. 4 is an enlarged view showing a support member 16.
Figure 5:
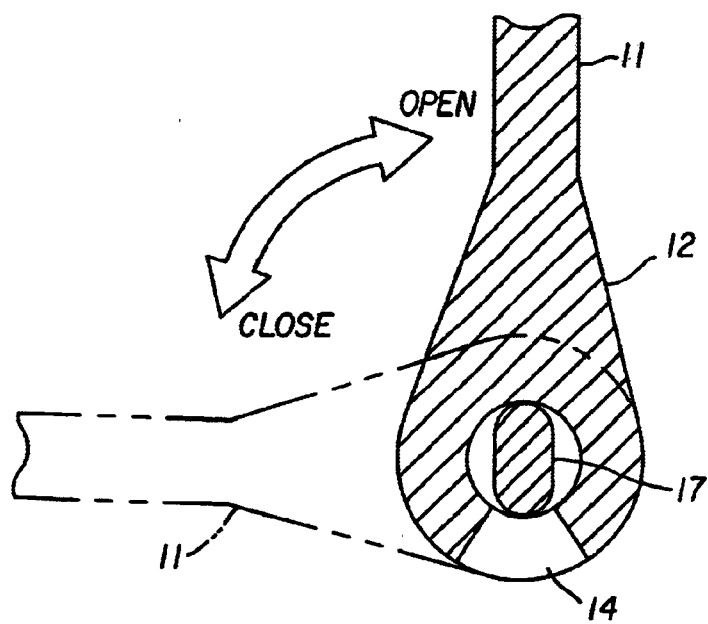
FIG. 5 is a longitudinal sectional view showing the state in which a ring portion 12 and a pin portion 17 are engaged with each other.

Support members 16 shown in FIG. 4 are provided between the side walls 3 and the rear wall 4 of the box body 2. The support members 16 are each comprised of a pair of convex portions 19 protruding upward from a base 18, and a pin portion 17 supported by the pair of convex portions 19. As shown in FIG. 5, the cross section of the pin portion 17 is elliptical.

Ring portion 12 engages support member 16 via pin portion 17. As shown in FIG. 5, the ring portion 12 is engaged with the pin portion 17 such that the ring portion 12 may turn. Specifically, the engagement of the ring portions 12 and the pin portions 17 enables the inner cover 11 to turn about an axis of the pin portions 17.

Figure 6A:
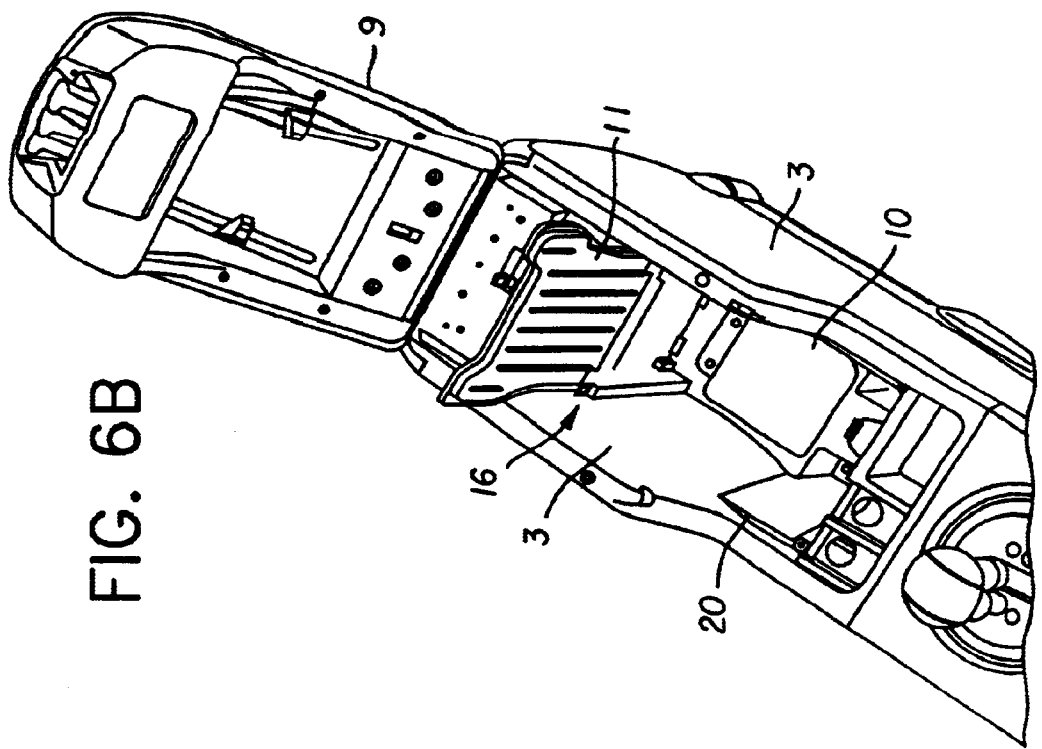
Figure 6B:
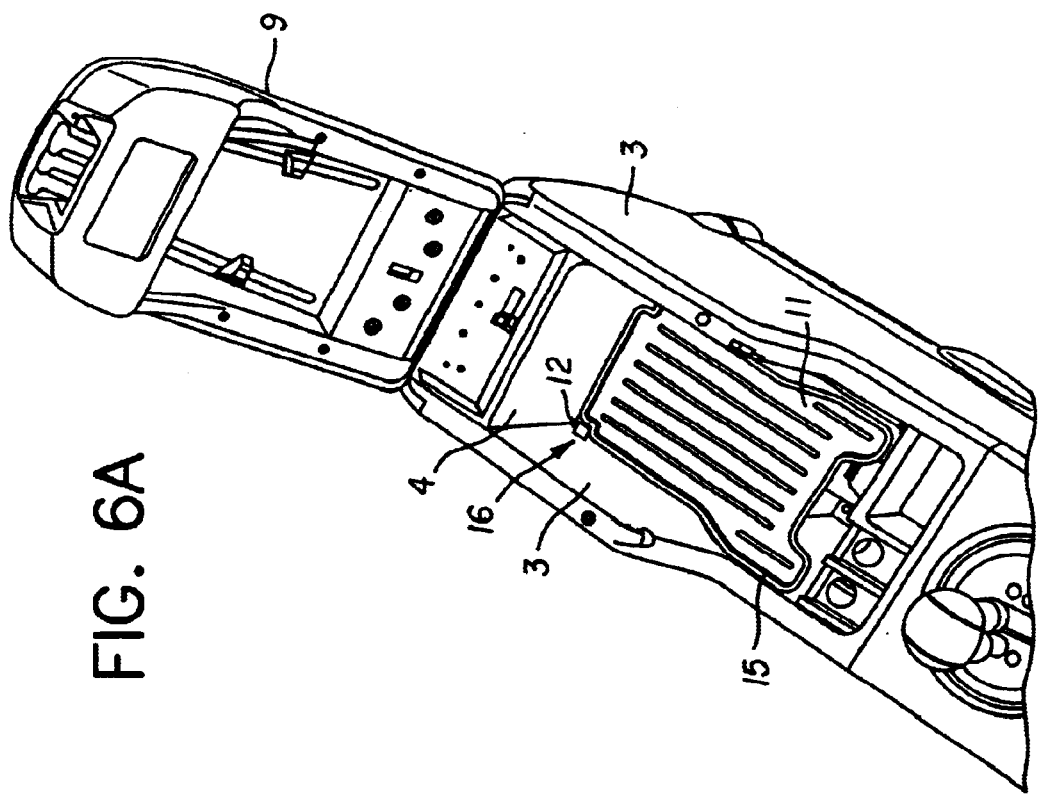

When the inner cover 11 is closed as indicated by a two-dot chain line of FIG. 5, the inner cover 11 is completely engaged with the pin portions 17 because the notches 14 are located behind the pin portions 17. On this occasion, a front side end of inner cover 11 is brought into contact with a contact portion 20 provided on the side wall 3 appearing in FIG. 6B, so that the inner cover 11 can be kept substantially parallel with the bottom part 10 as shown in FIG. 6A, enabling items to be placed on the upper surface of the inner cover 11. If the inner cover 11 is fully opened as indicated by a solid line of FIG. 5, the pin portion 17 can pass through the notches 14 because the notches 14 are positioned below the pin portions 17. Specifically, as shown in FIG. 6B, opening the cover member 9 and fully opening the inner cover 11 enables the inner cover 11 to be detached.

In operation, if the cover member 9 is closed as shown in FIG. 1, the upper space A is in communication with the outside via the second opening 7. Thus, it is possible to store or pick out small items and the like in or from the housing chamber 5 without opening the cover member 9. Alternatively, if the cover member 9 is opened and the inner cover 11 is closed as shown in FIG. 6A, an oblong bag or the like may be placed in the console box 1 because it has the second opening 7. Further, it the inner cover 11 is opened as shown in FIG. 6B (or the inner cover 11 is detached), the entire housing chamber 5 (the upper space A and the lower space B) may be used to store an item or items, such as a bag, that is longer than is wide in the console box 1.

The console box 1 is particularly well suited for storing an oblong item, an item which is longer than it is wide, or the like in a suitable form. It is to be understood, however, that there is no intention to limit the invention to the described embodiments or uses, but certain changes and modifications may be possible within the scope of the appended claims. For example, although in the above described embodiment, the cover member 9 is attached to the rear wall 4 via the hinge such that it may turn, but the cover member 9 may be attached to one of the side walls 3 via a hinge mounted thereto such that the cover member 9 may turn in the direction of the width of the vehicle.

Further, although in the above described embodiment, the support members 16 are mounted on the rear wall 4, but the support members 16 may be mounted on the side wall 3 such that the inner cover 11 may turn in the direction of the width of the vehicle.

Further, although in the above described embodiment, the height of the bottom part 10 of the box body 2 is set to be below the upper surface of the base 200 on which the shift lever 100 is mounted, but the inner cover 11 may be omitted to make the height of the bottom part 10 substantially flush with the upper surface of the base 200.

Further, although in the above described embodiment, the console box 1 is constructed such that the box body 2 and the base 200 on which the shift lever 100 is mounted are continuous, but the console box 1 may be constructed such that only the box body 2 is installed on a floor of the vehicle.

What is claimed is:

1. A console box structure comprising:

a box body comprising a pair of side walls, a rear wall connecting said pair of side walls to each other, and a bottom part, such that an opening is formed at a front of said box body and an opening is formed at a top of said box body; and a cover member capable of opening and closing the opening formed at the top of said box body.

2. A console box structure according to claim 1, further comprising a base, which extends continuously from said box body toward a front of the vehicle and on which a shift lever is mounted, wherein a bottom part of said box body is below an upper surface of said base.

3. A console box structure according to claim 1, comprising an inner cover that divides a housing chamber into at least an upper space and a lower space.

4. A console box structure according to claim 3, wherein a step portion is formed at least at a front edge of said inner cover.

5. A console box structure according to claim 3, wherein a concave portion is formed at a front of said inner cover.

6. A console box structure according to claim 3, comprising a support members mounted on the side walls or the rear wall to support said inner cover such that said inner cover may turn.

7. A console box structure according to claim 6, wherein each of said support members comprises a base, a pair of convex portions protruding upward from said base, and a pin portion whose cross section is substantially elliptical and which is provided between said pair of convex portions.

8. A console box structure according to claim 7, wherein ring portions each having a notch are provided at an end of said inner cover, and said ring portions are each engaged with said pin portion such that said ring portions may turn.

9. A console box structure according to claim 8, wherein said ring portions of said inner cover are capable of being detached from said pin portions when said inner cover is substantially fully open.

* * * * *